(12) United States Patent
Combes

(10) Patent No.: US 9,597,651 B2
(45) Date of Patent: Mar. 21, 2017

(54) REACTOR

(71) Applicant: JOHNSON MATTHEY PUBLIC LIMITED COMPANY, London (GB)

(72) Inventor: Gary Bevan Combes, Frankfurt am Main (DE)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/787,120

(22) PCT Filed: Apr. 17, 2014

(86) PCT No.: PCT/GB2014/051209
§ 371 (c)(1),
(2) Date: Oct. 26, 2015

(87) PCT Pub. No.: WO2014/181080
PCT Pub. Date: Nov. 13, 2014

(65) Prior Publication Data
US 2016/0121289 A1 May 5, 2016

(30) Foreign Application Priority Data
May 10, 2013 (GB) .................................. 1308429.8

(51) Int. Cl.
B01J 8/06 (2006.01)
B01D 53/04 (2006.01)
(Continued)

(52) U.S. Cl.
CPC .......... B01J 8/065 (2013.01); B01D 53/0431 (2013.01); B01J 8/0214 (2013.01); B01J 8/06 (2013.01);
(Continued)

(58) Field of Classification Search
CPC ... B01J 8/065; B01J 8/06; B01J 8/0214; B01J 2208/021; B01J 2208/00884;
(Continued)

(56) References Cited

U.S. PATENT DOCUMENTS

| 2,430,861 A | * | 11/1947 | Carpenter | .............. B01D 46/12 422/122 |
| 3,620,685 A | | 11/1971 | Ronald et al. | |
| 5,855,741 A | * | 1/1999 | Koch | ..................... B01D 3/009 202/158 |

FOREIGN PATENT DOCUMENTS

WO 2012/146903 A1 11/2012

OTHER PUBLICATIONS

International Search Report, dated Jul. 7, 2014, from corresponding PCT application.

* cited by examiner

Primary Examiner — Anthony J Zimmer
Assistant Examiner — Syed Iqbal
(74) Attorney, Agent, or Firm — Young & Thompson

(57) ABSTRACT

A reactor includes: a shell with first and second ends, an fluid inlet at the first end for receiving a process fluid, and an outlet at the second end for discharging a reacted process fluid, and a plurality of elongate containment units within the shell for containing a particulate catalyst or sorbent, each containment unit including two perforate members defining a space in which the particulate catalyst or sorbent may be placed, the perforate members mounted between two fluid-impermeable end members, wherein one end member extends across the containment unit to provide a closed end and the other end member closes the space thereby providing an open end through which a process fluid may enter or exit the containment unit, and a header assembly connected to the open ends of the containment units and either the fluid (Continued)

Figure 1:
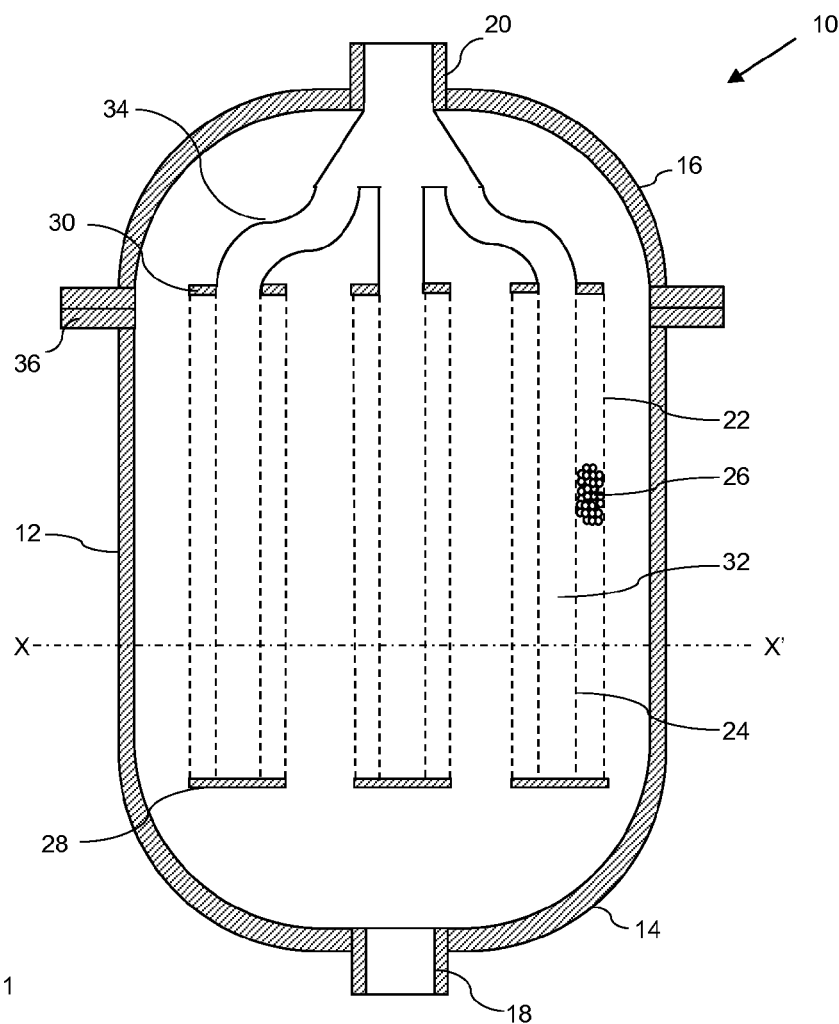

inlet or fluid outlet. A process using the reactor is also described.

19 Claims, 1 Drawing Sheet

(51) Int. Cl.
*B01J 8/02* (2006.01)
*C01B 3/16* (2006.01)
*C01B 3/58* (2006.01)

(52) U.S. Cl.
CPC ................ *C01B 3/16* (2013.01); *C01B 3/586* (2013.01); *B01J 2208/00884* (2013.01); *B01J 2208/021* (2013.01); *C01B 2203/0283* (2013.01); *C01B 2203/047* (2013.01); *C01B 2203/0445* (2013.01)

(58) Field of Classification Search
CPC ....... B01D 53/0431; C01B 3/16; C01B 3/586; C01B 2203/0283; C01B 2203/0445; C01B 2203/047
See application file for complete search history.

REACTOR

This invention relates to reactors in particular to radial flow reactors.

Radial flow reactors are known and generally comprise a cylindrical vessel with a process fluid inlet at one end and a process fluid outlet at the other and containing catalyst through which the process fluid flows radially. This is generally achieved by using catalyst containment means within the vessel that form a peripheral void around the bed of catalyst and also form a central void within the bed of catalyst. Baffles arranged in the reactor force the process fluid to flow into the peripheral void then through the catalyst then into the central void. Alternatively the process fluid may enter the central void and then pass through the catalyst to the peripheral void. The central and peripheral voids are in fluid communication with the inlet or outlet to allow the process fluid to enter and leave the vessel. Such reactors are described, for example, in U.S. Pat. No. 3,620,685.

However such arrangements are not suitable for all reactions, particularly where the pressure drop through the catalyst bed may be relatively high. We have devised an arrangement that overcomes the problems of the prior art reactors.

Accordingly, the invention provides a reactor comprising: a shell with first and second ends, a process fluid inlet at the first end for receiving a process fluid, and a process fluid outlet at the second end for discharging a reacted or decontaminated process fluid, and a plurality of elongate containment units within said shell for containing a particulate catalyst or sorbent, each containment unit comprising two perforate members defining a space in which the particulate catalyst or sorbent may be placed, said perforate members mounted between two process fluid-impermeable end members, wherein one end member extends across the containment unit to provide a closed end and the other end member closes the space thereby providing an open end through which a process fluid may enter or exit the containment unit, and a header assembly connected to the open ends of the containment units and either said process fluid inlet or said process fluid outlet.

The invention further provides a process using the reactor.

Thus the reactor in use comprises a plurality of radial flow catalyst or sorbent beds formed by the perforate members, each bed having a central void connected to a header assembly which is connected to a process fluid inlet or a process fluid outlet.

Thus in one embodiment the header assembly is connected to the first end, in which case a process fluid may be passed through an inlet in the first end to the header assembly and thence to the containment units through which it may pass radially outwards from central voids within the containment units into a space surrounding the containment units within the shell from which it may be recovered via the process fluid outlet in the second end.

In an alternative embodiment, the header assembly is connected to the second end, in which case a process fluid may be passed through an inlet in the first end into a space surrounding the containment units within the shell and then passed radially inwards through the containment units to central voids within the containment units from which it may be collected by the header assembly and then recovered via the process fluid outlet in the second end.

The reactor comprises a cylindrical shell and first and second ends, which may be flat but are preferably domed. The dimensions of the reactor are generally dictated by the volume of catalyst or sorbent required to perform the chosen duty, constrained by pressure drop and footprint requirements. Typically, the internal diameter of the reactor may be in the range 0.5 to 6 meters, preferably 2 to 4 meters with a total length in the range 1 to 15 meters, preferably 5 to 11 meters. The reactor may be fabricated from conventional materials such as steels suitable for use with the process fluids and capable of withstanding the process conditions. The reactor may be operated with the axis of the cylindrical shell aligned vertically, in which case the first and second ends may be described as the top or bottom ends. Preferably the first end is the bottom end and the second end the top end.

The process fluid inlet at the first end and the process fluid outlet at the second end are preferably located in-line with the axis of the cylindrical shell. The header assembly may be connected to the process fluid inlet or the process fluid outlet but is preferably connected to the outlet in the second end. A process fluid distributor is desirably connected to the inlet for distributing the process fluid evenly within the reactor. The header assembly may be of a conventional type comprising pipes connected to each the open ends of the containment units and connected to a central collector. The header assembly may therefore usefully support the plurality of containment units within the reactor.

The second end of the reactor is preferably detachably mounted on the shell, for example by means of a flange assembly. In this way, the second end may be separated from the reactor along with the header and containment units, which facilitates inspection and repair and catalyst or sorbent loading and unloading.

The reactor comprises a plurality of elongate perforate containment units between the ends within the shell for containing a particulate catalyst or sorbent. The number of containment units is preferably in the range 2-10, more preferably 5-10, most preferably 7, as this balances simplicity of design and ease of catalyst or sorbent loading with reduced pressure drop. The containment units may be arranged within the shell in a triangular pattern, where there are three units, a square pattern where there are four units, a pentagonal pattern where there are five units, a hexagonal patter where there are six units and a heptagonal pattern where there are seven units. Preferably the reactor comprises a central containment unit aligned with the axis of the reactor, surrounded by 4-9 containment units, especially six containment units, spaced evenly around the central containment unit.

Each containment unit comprises two perforate members defining a space in which a particulate catalyst or sorbent may be placed. Preferably the perforate members are evenly spaced. Accordingly, each containment unit comprises an outer perforate member, an inner perforate member, preferably arranged concentrically, and a central void within the inner perforate member to which or from which the process fluid may pass via the open end. The two perforate members are preferably cylindrical such that each containment unit comprise an inner perforate cylinder and an outer perforate cylinder, desirably of the same length, and arranged concentrically to provide a regular annular space into which the particulate catalyst or sorbent may be placed. The outer and inner perforate members may be formed from a perforate mesh, grid or screen, preferably that formed from a commercially available V-wire, with orifices desirably smaller than the catalyst or sorbent particle size. Preferably the perforate members in each containment unit are arranged to provide the same annular space. In this way the flow of process fluid though the catalyst or sorbent in the containment units may be evenly controlled. The perforate members in each containment unit are mounted between two process fluid-impermeable end members, wherein one end member extends across the containment unit to provide a closed end and the other end member closes the space thereby providing an open end through which a process fluid may enter or exit the containment unit. Where the perforate members are cylindrical, the end members are desirably circular or ring shaped in order to close the respective ends on the containment unit.

In use, the containment units each contain a particulate catalyst or sorbent. By the term, "sorbent" we include both adsorbent and absorbent. The same catalyst or sorbent is desirably placed in each containment unit within the reactor, although more than one catalyst or sorbent may be placed in each containment unit. The particulate catalysts or sorbents may be in the form of granulated agglomerates but are preferably pellets or extrudates, which may be cylindrical, fluted or lobed and have one or more through holes extending there-through. The pellets, extrudates or granules preferably have a width or diameter in the range 2-25 mm and an aspect ratio ≤3. The use of the containment units offers the potential for an improved packing density of the catalyst or sorbent versus a conventional radial bed. Improved packing leads to improved performance.

By providing a plurality of containment units, the invention also has the advantage that the containment units may be pre-filled and so installed already filled into the reactor, which speeds up installation and offers improvement in consistency of catalyst packing. Pre-filling also permits the catalyst or sorbent to be subjected more readily to any pre-treatment such as a reduction treatment or sulphidation. The containment units are therefore preferably detachably mounted on the header assembly, e.g. by means of a flange assembly, to allows removal of the containment units individually from the header for repair, replacement or replenishment.

Each of the containment units is preferably sized to provide a suitable gap between the containment units and the inside wall of the reactor for the flow of process fluid into or out of the containment units.

The size of the containment units will depend on the number of containment units and the internal diameter of the reactor. The size of the containment units may be the same or different. For example there may be a larger central containment unit surrounded by 3-6 smaller containment units, but preferably the containment units are the same size as this allows better control of the process. The space within each containment unit depends on the pressure drop and hence space velocity and the characteristics of the process fluid and catalyst or sorbent particles. The preferred arrangement of a central containment unit surrounded by six evenly spaced containment units of the same size typically will have a space between perforate members in the range 100-1000 mm, preferably 100-500 mm most preferably 100-250 mm for a reactor with an internal diameter in the range 2-4 m. The length of the containment units is a result of the sizing for a given catalyst or sorbent volume based on pressure drop or vessel diameter constraints.

The process using the reactor comprising the steps of:
(i) passing a process fluid to a process fluid inlet of a reactor, said reactor comprising a cylindrical shell with first and second ends, said process fluid inlet at the first end and a process fluid outlet at the second end,
(ii) passing the process fluid from the process fluid inlet to a plurality of elongate containment units located between said ends within said shell, each containment unit comprising two perforate members defining a space in which a particulate catalyst or sorbent is placed, said perforate members mounted between two process fluid-impermeable end members, wherein one end member extends across the containment unit to provide a closed end and the other end member closes the space thereby providing an open end, and a header assembly connected to the open ends of the containment units and either said process fluid inlet or process fluid outlet,
(iii) passing the process fluid radially through the catalyst or sorbent contained within the containment units to form a reacted or decontaminated process fluid,
(iv) passing the reacted or decontaminated process fluid from the containment units to the process fluid outlet,
(v) and recovering the reacted or decontaminated process fluid from the process fluid outlet.

In one embodiment the reactor is an absorption vessel that contains a sorbent for removing a component from the process fluid. The process fluid may be a hydrogen gas stream, a carbon dioxide gas stream, a synthesis gas stream or preferably a hydrocarbon gas stream such as natural gas or associated gas. Components that may be removed include sulphur compounds, halogen compounds and heavy metals such as mercury, arsenic, antimony and cadmium. Suitable sorbents for capturing these components are known and include carbon, transition metal oxides or carbonates, transition metal sulphides and alkali-metal containing compositions.

In another embodiment, the reactor is a catalyst vessel that contains a catalyst for converting a component of the process fluid. The process fluid is preferably gaseous. The process fluid fed to the reactor is preferably a synthesis gas, which may be reacted over a suitable synthesis gas conversion catalyst to either change the hydrogen content of the synthesis gas, convert carbon oxides present in the synthesis gas to methane or to form methanol or ammonia, which may be recovered downstream. Thus in one embodiment the catalyst is a water-gas shift catalyst and the reactor is therefore a water-gas shift reactor. In another embodiment the catalyst is a methanation catalyst and the reactor is therefore a methanation reactor. In another embodiment the catalyst is a methanol synthesis catalyst and the reactor is therefore a methanol synthesis reactor. In yet another embodiment the catalyst is an ammonia synthesis catalyst and the reactor is therefore an ammonia synthesis reactor.

Preferably the synthesis gas comprises hydrogen, carbon monoxide and/or carbon dioxide, and optionally steam.

In a particularly preferred embodiment, the reactor is used for the water-gas shift reaction, especially a so-called sour-shift water gas shift reaction, used to increase or decrease the hydrogen content of synthesis gases. The reaction may be depicted as follows;

$$H_2O + CO \leftrightarrow H_2 + CO_2$$

This reaction is exothermic, and conventionally it has been allowed to run adiabatically, with control of the exit temperature governed by feed gas inlet temperature and composition.

We have found that the disadvantages of the previous water-gas shift processes may be overcome using a water-gas shift stage operated using the radial-flow reactor of the present invention.

In a preferred embodiment, the process fluid fed to the reactor is a synthesis gas mixture comprising hydrogen, carbon oxides and steam and containing one or more sulphur compounds, having a ratio, R, defined as $R = ([H_2] - [CO_2])/([CO] + [CO_2]) \leq 0.6$ and a steam to carbon monoxide ratio ≤1.8. The synthesis gas may be produced by gasification of a carbonaceous feedstock, such as coal, petroleum coke or another carbon-rich feedstock such as biomass. Before the synthesis gas is subjected to the water-gas shift reaction, it is preferably cooled, optionally filtered and then washed to remove particulates such as coal ash. The R ratio in the synthesis gas is preferably ≤0.6, more preferably in the range 0.1 to 0.6, most preferably in the range 0.2 to 0.6. R may readily be calculated from the molar quantities of the components in the synthesis gas feed. The synthesis gas comprises one or more sulphur compounds such as hydrogen sulphide or carbonyl sulphide. In order that the water-gas shift catalysts remain suitably sulphided, the sulphur content of the synthesis gas fed to the water-gas shift catalyst is desirably >250 ppm.

If the synthesis gas does not contain enough steam for the water-gas shift process, steam may be added to the synthesis gas, for example by live steam addition or saturation or a combination of these. The steam to carbon monoxide ratio (i.e. molar ratio) of the synthesis gas mixture fed to the water-gas shift catalyst may be up to 3 or higher but is preferably ≤1.8 and more preferably is in the range 0.2 to 1.8, most preferably 0.7 to 1.8. In some embodiments, it may be desirable to operate with a ratio in the range 0.95 to 1.8.

The water-gas shift catalyst may be any suitably stable and active water-gas shift catalyst. Iron-based and copper-based water-gas shift catalysts are well known and may be used. Such catalysts operate with the iron or copper in a reduced form. Alternatively manganese-based catalysts may be used. In particular so-called "sour shift" catalysts may be used, in which the active components are metal sulphides. Preferably the water-gas shift catalyst comprises a supported cobalt-molybdenum catalyst that forms molybdenum sulphide in-situ by reaction with hydrogen sulphide present in the synthesis gas stream. The Co content, expressed as CoO, is preferably 2-10% wt and the Mo content, expressed as $MoO_3$, is preferably 5-20% wt. Alkali metal promoters may also be present at 1-10% wt. Suitable supports comprise one or more of alumina, magnesia, magnesium aluminate spinel and titania. The catalysts may be supplied in oxidic form, in which case they require a sulphiding step, or they may be supplied in a pre-sulphided form. Particularly preferred sour shift catalysts are supported cobalt-molybdate catalysts such as KATALCO™ K8-11 available from Johnson Matthey PLC, which comprises about 3% wt. CoO and about 10% wt. $MoO_3$ supported on a particulate support containing magnesia and alumina.

The synthesis gas and steam mixture may be passed at elevated temperature and pressure, preferably temperatures in the range 190 to 420° C. more preferably 200 to 400° C., and pressure up to about 85 bar abs, preferably 25-85 bar abs, over the bed of water-gas shift catalyst. The flow-rate of synthesis gas containing steam may be such that the gas hourly space velocity (GHSV) through the bed of sulphur-tolerant water-gas shift catalyst in the reactor may be ≥6000 $hour^{-1}$.

The water-gas shift reaction occurs, consuming carbon monoxide and steam and forming carbon dioxide and hydrogen.

If desired, a by-pass stream of synthesis gas may by-pass the reactor to be mixed with the cooled reacted process fluid recovered from the process fluid outlet.

The reactor may be used alone, but is preferably used in combination with other water-gas shift reactors. In a preferred embodiment, the reactor is used in combination with one or more adiabatic or gas-cooled reactors, each containing a suitable water-gas shift catalyst.

The resulting shifted gas stream from the water-gas shift stage may be subjected to further processing including the steps of: cooling the shifted gas stream, or a mixture of the shifted gas stream and a bypass stream, to below the dew point to condense water; separating the resulting condensate therefrom to form a dry shifted gas stream; feeding the dry shifted gas stream to a gas-washing unit operating by means of counter-current solvent flow, to produce a product synthesis gas enriched in hydrogen; and collecting the product synthesis gas from the washing unit.

After such further processing to remove water and adjust the carbon dioxide content, the product synthesis gas may be used in downstream processes for the production of methanol, dimethylether (DME), Fischer-Tropsch (FT) liquids or synthetic natural gas (SNG). Where a higher degree of water-gas shift is required, for example when making hydrogen for ammonia synthesis or a low carbon content fuel for combustion in a gas turbine, additional water-gas shift steps may be performed.

Figure 2:
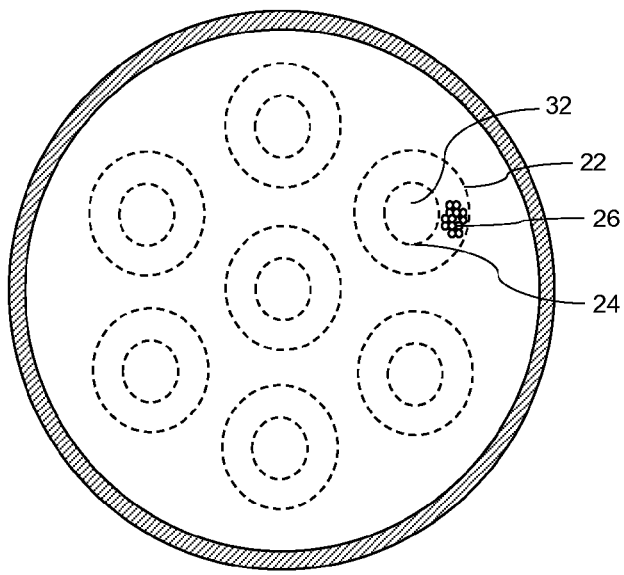

The invention is further illustrated by reference to the accompanying drawings in which;

FIG. 1 is a vertical cross-section of a reactor according to one embodiment of the invention, and FIG. 2 is a horizontal cross-section of the reactor according to FIG. 1 at the point X-X', illustrating the layout of the containment containment units within the shell.

In FIG. 1, a reactor 10 comprises an elongate cylindrical shell 12 aligned vertically with a first domed end 14 at the bottom and a second domed end 16 at the top. The first end 14 has a process fluid inlet 18 positioned in line with the vertical axis of the reactor. A process fluid distributor (not shown) may be attached to the process fluid inlet 18 within the reactor. The second end has a process fluid outlet 20 also in line with the vertical axis of the reactor. The shell 12 contains seven elongate containment units extending within the shell from a position adjacent the first end 14 to a position adjacent the second end 16. For simplicity only three containment units are shown in FIG. 1. Each containment unit comprises an outer perforate cylinder 22 and an inner perforate cylinder 24 between which a particulate catalyst or sorbent 26, for example a sour shift catalyst, may be placed. The cylinders 22, 24 are mounted between a circular baffle plate 28 and an annular baffle plate 30. The circular baffle plate 28 has a diameter about that of the outer perforate cylinder 22 and so forms a closed end. The annular baffle plate 30 extends across the annular space between the outer and inner perforate cylinders 22, 24 and so forms an open end in communication with a central void 32 within the inner perforate member 24. In this embodiment, the closed ends of the containment units are adjacent the first end and the open ends are adjacent the second end 16. A header assembly 34 is fixed to each of the containment units and connects the open ends of the containment units, formed by the annular baffle plates 30, to the process fluid outlet 20.

The header assembly 34 is fixed to the second end 16, which is detachably mounted on the shell 12 by means of a flange assembly 36. In this way the second end 16, header assembly 30 and containment units 22, 24, 28, 30, 32 attached thereto may be removed as a single containment unit from the reactor for inspection and repair. The containment units 22, 24, 28, 30, 32 are detachably mounted on the header assembly 34 by means of a containment unit flange assembly (not shown) that allows removal of the containment units individually from the header assembly for repair, replacement or replenishment.

FIG. 2 depicts a cross-section of the shell 12 at the position X-X'. The containment units 22, 24, 32 are arranged within the shell with six containment units arranged in a hexagonal pattern and a central containment unit located within the hexagon and co-axial with the vertical axis of the reactor. The six outer containment units are evenly spaced around the central containment unit.

In use a process fluid, for example a synthesis gas derived from coal gasification, is fed into the reactor 10 via process fluid inlet 18 in the first end 14 and into the shell 12. The process fluid then passes radially inwards through the catalyst 26, e.g. a sour shift catalyst, disposed within the containment units 22, 24, 28, 30, to the central void 32 in the containment unit. The resulting reacted process fluid passes from the void 32 through the open end of the containment unit to header 34 which directs the reacted process fluid to the to the process fluid outlet 20, from which it may be recovered.

The invention claimed is:

1. A reactor comprising: a shell with first and second ends, a process fluid inlet at the first end for receiving a process fluid, and a process fluid outlet at the second end for discharging a reacted or decontaminated process fluid, and a plurality of elongate containment units within said shell for containing a particulate catalyst or sorbent, each containment unit comprising two perforate members defining a space in which the particulate catalyst or sorbent may be placed, said perforate members mounted between two process fluid-impermeable end members, wherein one end member extends across the containment unit to provide a closed end and the other end member closes the space thereby providing an open end through which a process fluid may enter or exit the containment unit, and a header assembly connected to the open ends of the containment units and either said process fluid inlet or said process fluid outlet, wherein each containment unit comprises an outer perforate member and an inner perforate member, arranged concentrically, and a central void within the inner perforate member to which or from which the process fluid may pass via the open end.

2. The reactor according to claim 1, wherein the header assembly is connected to the first end.

3. The reactor according to claim 1, wherein the header assembly is connected to the second end.

4. The reactor according to claim 3, wherein the second end of the reactor is detachably mounted on the shell.

5. The reactor according to claim 1, wherein the number of containment units is in the range 2-10.

6. The reactor according to claim 1, wherein the reactor comprises a central containment unit aligned with the axis of the reactor, surrounded by 4-9 containment units spaced evenly around the central containment unit.

7. The reactor according to claim 1, wherein the two perforate members are cylindrical such that each containment unit comprise an inner perforate cylinder and an outer perforate cylinder arranged concentrically to provide a regular annular space into which the particulate catalyst or sorbent may be placed.

8. The reactor according to claim 1, wherein each containment unit comprises a particulate catalyst or sorbent.

9. The reactor according to claim 1, wherein the containment units are detachably mounted on the header assembly.

10. The reactor according to claim 5, wherein the number of containment units is in the range 5-10.

11. A process using the reactor according to claim 1 comprising the steps of:
(i) passing a process fluid to a process fluid inlet of a reactor, said reactor comprising a cylindrical shell with first and second ends, said process fluid inlet at the first end and a process fluid outlet at the second end,
(ii) passing the process fluid from the process fluid inlet to a plurality of elongate containment units within said shell, each containment unit comprising two perforate members defining a space in which a particulate catalyst or sorbent is placed, said perforate members mounted between two process fluid-impermeable end members, wherein one end member extends across the containment unit to provide a closed end and the other end member closes the space thereby providing an open end, and a header assembly connected to the open ends of the containment units and either said process fluid inlet or said process fluid outlet, wherein each containment unit comprises an outer perforate member and an inner perforate member, arranged concentrically, and a central void within the inner perforate member to which or from which the process fluid may pass via the open end
(iii) passing the process fluid radially through the catalyst or sorbent contained within the containment units to form a reacted or decontaminated process fluid,
(iv) passing the reacted or decontaminated process fluid from the containment units to the process fluid outlet, and
(v) recovering the reacted or decontaminated process fluid from the process fluid outlet.

12. The process according to claim 11 wherein the containment unit comprises a particulate sorbent for removing a component from the process fluid.

13. The process according to claim 11 wherein the containment unit comprises a particulate catalyst for converting a component of the process fluid.

14. The process according to claim 13 wherein the process fluid comprises a synthesis gas.

15. The process according to claim 13 wherein the catalyst is selected from the group consisting of a water-gas shift catalyst, a methanation catalyst, a methanol synthesis catalyst, and an ammonia synthesis catalyst.

16. The process according to claim 12 wherein the process fluid is selected from a hydrogen gas stream, a carbon dioxide gas stream, a synthesis gas stream or a hydrocarbon gas stream.

17. The process according to claim 12, wherein the process fluid is a hydrocarbon gas stream selected from natural gas or associated gas.

18. The process according to claim 12, wherein the component removed from the process fluid is selected from a sulphur compound, a halogen compound and a heavy metal selected from mercury, arsenic, antimony and cadmium.

19. The process according to claim 12, wherein the particulate sorbent is selected from carbon, transition metal oxides or carbonates, transition metal sulphides and alkali-metal containing compositions.

* * * * *